Dec. 4, 1973  A. ZAFFARONI  3,777,015
DEVICE FOR SUPPRESSING FERTILITY
Filed Aug. 16, 1972  2 Sheets-Sheet 1

Dec. 4, 1973  A. ZAFFARONI  3,777,015
DEVICE FOR SUPPRESSING FERTILITY
Filed Aug. 16, 1972  2 Sheets-Sheet 2

United States Patent Office 3,777,015
Patented Dec. 4, 1973

3,777,015
DEVICE FOR SUPPRESSING FERTILITY
Alejandro Zaffaroni, Atherton, Calif., assignor to Alza Corporation
Original application Jan. 19, 1970, Ser. No. 3,852, now Patent No. 3,699,951. Divided and this application Aug. 16, 1972, Ser. No. 281,148
Int. Cl. A61f 5/46; A61m 7/00
U.S. Cl. 424—15                                  7 Claims

ABSTRACT OF THE DISCLOSURE

Fertility suppression in a female mammal is achieved with a device for insertion and retention in the uterus in the form of a flexible, resilient body of polymeric material having an elastic memory. The body has an ellipsoidal shape and a fluted surface. When inserted into the uterine cavity in a compacted state, the body assumes an ellipsoidal configuration. Preferably, the device contains a progestational anti-fertility agent, most preferably progesterone, and is permeable to passage of the progestational anti-fertility agent at a low rate. Upon insertion in the uterus, the device releases a fertility suppressing amount of the progestational anti-fertility agent to the uterus.

CROSS-REFERENCE TO RELATED APPLICATION

This application is a division of patent application U.S. Ser. No. 3,852, filed on Jan. 19, 1970, now U.S. Pat. No. 3,699,951 and assigned to the same assignee of this application.

BACKGROUND OF THE INVENTION

This invention relates to an anti-fertility device, and more especially, to an anti-fertility device for insertion, retention, and the release of a progestational anti-fertility agent in the uterus.

Intrauterine contraceptive devices have become an increasingly popular method of birth control. Widely used devices include the Lippe's Loop, Margulie's Spiral, Birnberg Bow, Grafenberg Ring, and the like. In general, these prior art devices are formed of thin rods or solid tubes of polymeric material bent to a shape which will abut against the walls of the uterus. Forces exerted by uterine contraction frequently expel these intrauterine devices. And the constant contact of the uterine walls with the bent-rod-like configuration of such intrauterine devices has caused irritation, erosion and even puncture of the uterine walls.

To reduce uterine contractility and hopefully to overcome these disadvantages, it has been proposed by the prior art to incorporate certain progestational agents into intrauterine devices, as described in Amer. J. Obstet. Gynecol., by Doyle et al., vol. 101, 564–568, 1968. Other investigators have incorporated selected progestational agents in these intrauterine devices with the aim of controlling fertility by the hormonal effect from the gradual release of the progestational agent. For example, see "Intrauterine Administration of progesterone by a Slow Releasing Device" by Scommegna et al., presented at annual meeting of the American Fertility Society, April 1969. While there are indications that problems of expulsion, erosion, and irritation may be minimized by use of a progestational agent, these problems are inherent in the conventional bent rod configuration of the presently used intrauterine device and these problems have not been overcome by the incorporation of such chemical agents.

More recently, various inflatable intrauterine contraceptive devices have been proposed for possible use as contraceptive devices. These, however, have substantial inherent disadvantages and dangers which have prevented their acceptance by the medical community. The theory of these devices is that they will be inserted into the uterus in an original collapsed condition and, when in place, inflated by means of air or liquid under pressure to an expanded condition. Inflation of such devices creates substantial dangers of uterine rupture unless done with the most extreme care. Moreover, there is a serious risk of infection unless the air or liquid is highly sterile.

SUMMARY OF THE INVENTION

Accordingly, it is an object of this invention to provide an improved intrauterine birth control device which overcomes problems inherent in related devices previously proposed.

Another object of this invention is to provide an intrauterine device of improved shape which is non-irritating to the uterus, does not cause erosion or perforation of the uterine walls, can be easily inserted, and will remain in place for long periods of time.

Still another object of this invention is to provide an intrauterine contraceptive device of improved configuration containing and gradually releasing to the uterus a progestational anti-fertility agent.

Yet still another object of this invention is to provide an easy-to-use method for producing an anti-fertility effect by providing a contraceptive device suitable for continuously administering quantities of the progestational anti-fertility agent within uteri for producing the desired effect.

In attaining these objects, one feature of this invention resides in an intrauterine device comprised of a flexible, resilient body of polymeric material having an elastic memory. The body has an ellipsoidal shape and a fluted surface. When inserted into the uterine cavity in a compacted state, the body will assume an ellipsoidal configuration and resist expulsion. Another feature of this invention resides in releasing in uteri a progestational agent from a device whose body is comprised of an ellipsoidal shape and a fluted surface.

A further feature of this invention resides in an intrauterine device for suppressing fertility, as described above, containing the progestational anti-fertility agent and being permeable to passage of the progestational anti-fertility agent so that when inserted in the uterine cavity of a warm blooded female, including human, the body will release a fertility suppressing amount of the progestational anti-fertility agent to the uterus over a prolonged period of time.

Other objects, features and advantages of this invention will become more apparent from the following detailed description, and the drawings and the accompanying claims.

BRIEF DESCRIPTION OF THE DRAWINGS

In the drawings, which are not drawn to scale, but rather are set forth to illustrate various devices and embodiments of the invention, the drawings are as follows.

In the specification and the drawings, like parts in related figures are identified by like numbers. The terms appearing earlier in the specification and in the description of the drawings, as well as embodiments thereof, are further discussed elsewhere in the disclosure.

DETAILED DESCRIPTION OF THE INVENTION

In accordance with this invention, there is now provided a novel and useful device for suppressing fertility in a warm blooded female animal with the device having the shape and physical characteristics compatible with long-term retention in the uterus of a mature female animal without undesirable side effects.

Figure 1:
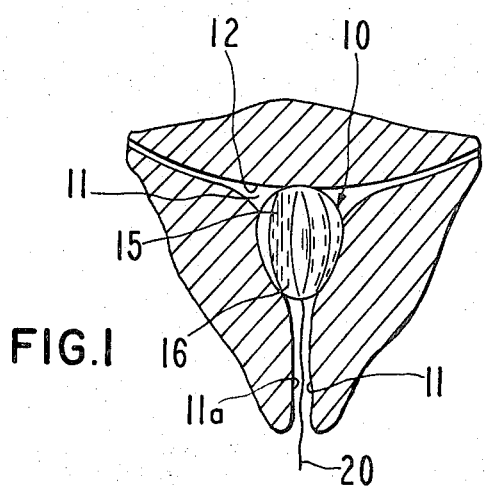
FIG. 1 is a frontal section through the uterus showing one embodiment of the intrauterine contraceptive device placed in the uterine cavity.
Figure 2:
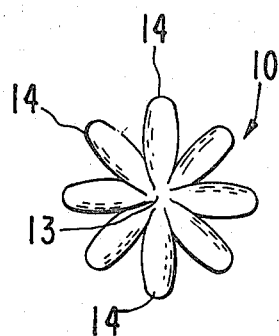
FIG. 2 is an end view of the intrauterine device of FIG. 1.

As illustrated in FIGS. 1 and 2, the device 10 of the invention is adapted for placement in a uterus 11 generally defined by side walls 11 and top wall 12. Device 10 is a body having an ellipsoidal shape and a central core 13, as seen in FIG. 2, and a fluted surface, defined by multiple projections 14 running longitudinally of body 15. As used herein, an ellipsoidal body need not be a true ellipsoid but includes any rounded body having no sharp edges or points and not necessarily of symmetrical configuration. It includes spheres, pear-shapes, egg-shapes, and the like. In the presently preferred embodiment of the invention illustrated in FIG. 1, device 10 is tapered toward its lower end and therefore has a larger cross-sectional area toward its top 15 than toward its bottom 16 as illustrated in FIG. 1. Device 10 is also equipped with a nylon thread or suitable string 20 for manually removing device 10 from a uterus 11.

Intrauterine device 10 of the invention is formed of a flexible, resilient polymeric material insoluble in body fluids and having an elastic memory. It can be compacted or folded about its longitudinal axis and inserted in the uterine cavity in the compacted state. Due to the elastic memory of the polymeric material from which it is formed, the intrauterine device will assume its ellipsoidal configuration upon placement in the uterus.

Figure 3:
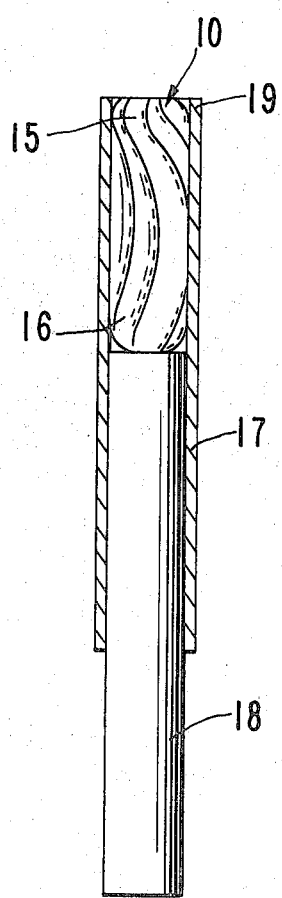
FIG. 3 is a side view, partially in cross-section, of the intrauterine device of FIG. 1 within an insertion device.
Figure 4:
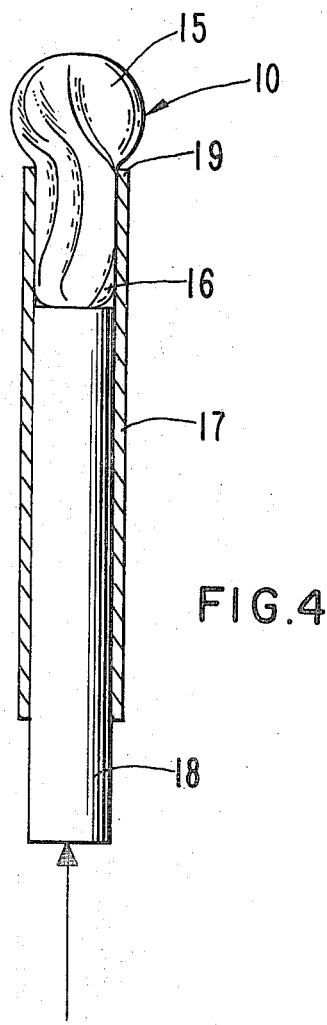
FIG. 4 is a side view, partially in cross-section, of the intrauterine device of FIG. 1 partially ejected from an insertion device.

Thus, as illustrated in FIG. 3, device 10 can be placed in a compacted or folded configuration within a suitable cylindrical insertion device 17 having a slidable plunger 18. Front portion 19 of insertion device 17 is placed within the uterine cavity and plunger 18 moved forward positioning device 10 into the uterine cavity 11. As it moves from insertion device 17, device 10 unfurls to assume its ellipsoidal configuration, as illustrated in FIG. 4.

Device 10 of thhe invention, because of its bulbous fluted shape, is well adapted for comfortable long-term retention in the uterus. When a force is applied to the device by uterine muscular contractions, the device absorbs the force and it yields, rather than reacting against the uterine walls as takes place with a conventional intrauterine device formed from rods or tubes. While conventional intrauterine devices have sharp or hard edges and surfaces which can erode and even perforate the uterine walls, the flexible, resilient ellipsoidal uterine device of the invention has a physiological shape well suited to its role.

Figure 5:
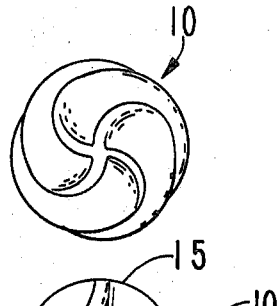
FIG. 5 is an end view of another embodiment of the intrauterine device of the invention.
Figure 6:
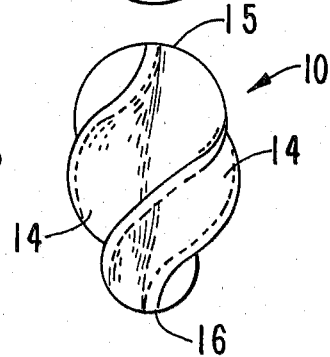
FIG. 6 is a side view of the intrauterine device of FIG. 5.
Figure 7:
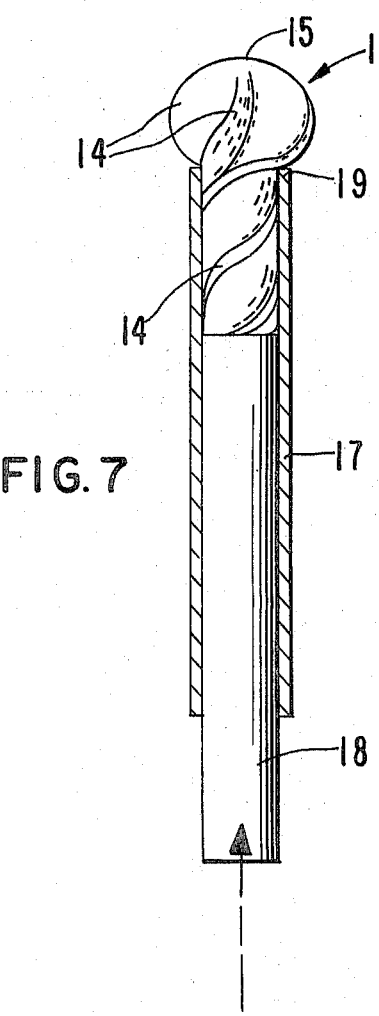
FIG. 7 is a side view of the intrauterine device of FIG. 5 partially ejected from an insertion device.

FIGS. 5, 6 and 7 illustrate another embodiment of intrauterine device 10 of the invention wherein the projections or ridges 14, as seen in FIG. 6, are disposed helically about the longitudinal axis of the ellipsoidal body. Device 10 can be compacted by rolling or folding projections 14 about the longitudinal axis. As best shown in FIG. 7, when device 10 is in position within the uterine cavity, not shown, from a suitable insertion device 17, projections 14 resume their helical disposition and device 10 again assumes its ellipsoidal shape. In this manner, intrauterine device 10 can be easily inserted in drug delivery intrauterine position. Projections 14 are formed of flexible resilient materials, allowing the device to comfortably remain within the uterine cavity for long periods of time.

Figure 8:
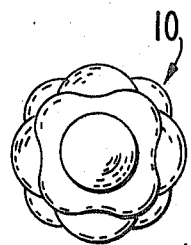
FIG. 8 is an end view of still another embodiment of the intrauterine device of the invention.
Figure 9:
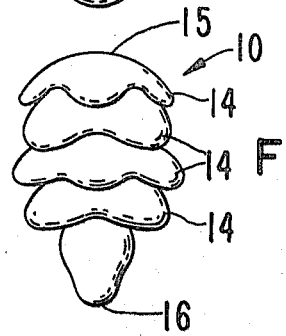
FIG. 9 is a side view of the intrauterine device of FIG. 8.
Figure 10:
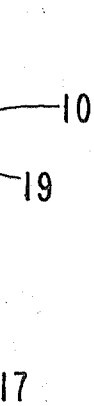
FIG. 10 is a side view of the intrauterine device of FIG. 8 partially ejected from an insertion device.

A further embodiment of the intrauterine device 10 is illustrated in FIGS. 8, 9 and 10. As best shown in FIG. 9, device 10 can have projections 14 arranged horizontally about its longitudinal axis. Varying numbers of tiers of such projections can be present. To compact device 10 for insertion, projections 14 are folded downwardly. Upon placement in the uterus with an insertion device 17, projections 14 spring upwardly and the ellipsoidal shape of the body is restored. This shape too of device 10 is well suited for long term retention in the uterus.

While the intrauterine device 10 of the invention can be employed alone to provide an effective means of birth control, it is preferred to incorporate a biologically acceptable progestational anti-fertility agent which will be gradually released to the uterus from the device. When this is done, the device of the invention acts as a depot or drug reservoir, containing and releasing at a predetermined rate a progestational anti-fertility agent. Commencement and termination of action are controlled by insertion and removal of the device from the uterus. Within these time limits, the amount of progestational anti-fertility agent available is controlled by release of the agent from the device at a pre-determined rate.

When device 10 of the invention is used as a drug reservoir, a wide variety of progestational anti-fertility agents can be incorporated in and gradually released from the device. The phrase or expression "progestational anti-fertility agent" is used herein in its broadest sense as meaning any chemical progestational agent that will suppress reproductive development. The phase generically includes for example agents which are spermicidal, or inhibit egg implantation, or inhibit egg mobility, or prevent ovulation, or inhibit sperm capacitation or increase thickness of the cervical mucosa. Suitable progestogens include, without limitation:

progesterone;
progesterone cyclopentyl enol ether;
6-dehydroretroprogesterone;
17$\alpha$-hydroxy-progesterone caproate;
6$\alpha$-methyl-17$\alpha$-acetoxyprogesterone;
6-methyl-6-dehydro-17$\alpha$-acetoxyprogesterone;
6-methyl-16-methylene-6-dehydro-17$\alpha$-acetoxyprogesterone;
6-chloro-17$\alpha$-acetoxy-6-dehydroprogesterone;
6,17$\alpha$-acetoxy-6-dimethyl-6-dehydroprogesterone;
6,16$\alpha$-dimethyl-6-dehydro-17$\alpha$-acetoxy-progesterone;
17$\alpha$-acetoxyprogesterone-3-cyclopentyl enol ether;
17-ethinyltestosterone;
dimethylethinyltestosterone;
17-nor-progesterone, 19-nor-17-ethinyltestosterone;
19-nor-17-ethinyl-testosterone acetate;
17-ethinyl-17$\beta$-hydroxy-5(10)-estren-3-one;
17-ethinyl-4-estrene-3$\beta$,17$\beta$-diol diacetate;
17$\alpha$-vinylestr-5(10)-en-17$\beta$-ol-3-one;
19-nor-3-desoxy-17-ethinyltestosterone;
19-nor-3-desoxy-17-allyltestosterone; and
17-ethinyl-19-testosterone acetate 3-cyclopentyl enol ether, and the like.

With progestational agents lacking the desired release characteristics from the device, simple pharmacologically acceptable derivatives of the hormones can be employed. Suitable derivatives include esters with pharmaceutically acceptable acids, such as the acetate, maleate, citrate, oxalate, succinate, caproate, benzoate, tartrate, fumarate, malate, mandelate, ascorbate, and the like; ethers, especially lower alkyl ethers; acetals, etc. These derivatives should be such as to convert to the parent progestational agent on release from the device, by enzymatic transformation, pH assisted hydrolysis; and the like.

Progesterone, the natural progestational agent, is the preferred anti-fertility agent for use in this invention. Device 10, by locally applying a continuous amount of progesterone to the uterus, the desired progestational activity is obtained in uterus 11. Progesterone is rapidly metabolized in the uterine walls to metabolites which are progestationally inactive outside of the uterus. Thus, the situs of progestational activity is circumscribed within the uterus. Undesired systemic progestational activity is not obtained and a physiologic means of birth control is provided.

The amount of progestational agent incorporated in the device to obtain the desired fertility suppression will vary depending on the particular agent used and the length of time device 10 is to remain in uterus 11. Since the devices of the invention are intended to control fertility for an extended period of time, such as three months to one year or more, there is no critical upper limit on the amount of agent incorporated in a device. For when the device is removed from the uterus and disposed of, it makes little difference whether any agent remains in the device. The lower limit will depend on the activity of the progestational agent and its capability of being released to the uterus. Thus, it is not practical to define a range for the fertility suppressing amount of progestational agent incorporated in or released from these devices. However, with devices containing progesterone and intended to remain in place for one year, typically, from 40 to 500 milligrams of progesterone are incorporated in the devices. Such devices are designed to release progesterone at a rate of from 100 micrograms to 1 milligram per day, for controlling fertility in an adult woman. With devices containing a more highly active progestational agent, such as 6-chloro-17α-acetoxy-6-dehydroprogesterone, and also designed for one year of use, from 10 to 100 milligrams of anti-fertility agent is incorporated in the device and the device is designed to release the anti-fertility agent at a rate between 20 and 200 micrograms per day for controlling fertility in an adult woman weighing about 40 to 70 kg. For devices containing other progestational agents as above listed, the progestational agent is incorporated in and released from the device in an amount equivalent in activity to these ranges.

Devices containing the progestational anti-fertility agent are formed at least in part of an essentially non-toxic material permeable to the agent, as by diffusion. to permit passage of the agent through the walls or body of the device at a relatively low rate. Normally, the rate of passage of the agent through the wall or body is dependent on the porosity of the wall or body or on the solubility of the progestational anti-fertility agent in the wall or body, as well as on the wall or body thickness. This means that selection of appropriate materials for fabricating the device will be dependent on the particular anti-fertility agent to be used. By varying the composition, porosity, and thickness of the device wall or body, the release rate per area of device can be controlled; for the wall or body of the device act as solubility membranes or diffusion control systems to regular or meter the flow of progestational anti-fertility agent from the device to the uterus. Thus, fertility suppressing devices of the same surface area can provide different release rates and therefore different daily dosages of the progestational anti-fertility agent by varying the characteristics of the device.

Suitable devices can be formed by molding into the form of a hollow container of appropriate fluted ellipsoidal shape with the progestational anti-fertility agent contained therein. While the device walls can be of any convenient thickness, usually they have a thickness of from 0.01 to 3 millimeters. Alternatively, the device can comprise a resilient, flexible solid or gel matrix having the progestational anti-fertility agent distributed therethrough. This can be accomplished by adding the agent to the matrix material in liquid form and subsequently converting the matrix to a solid or gel by curing or cooling; or by immersing the solid matrix in the progestational anti-fertility agent or a solution of the progestational anti-fertility agent to effect diffusion of the agent into the matrix. In a further embodiment, the progestational anti-fertility agent can be encapsulated with a material permeable to passage of the agent and the microcapsules distributed throughout the solid or gel matrix. By microencapsulating the agent, further control over the rate of release of the progestational anti-fertility agent from the device is provided. In lieu of the above forms, the device can be a resilient, flexible polymeric foam or cellular body with the progestational anti-fertility agent distributed throughout its cell walls. Such foams can be formed by mixing the progestational anti-fertility agent with the monomers or prepolymer prior to foaming to form the cellular device. Although the foregoing forms of the device in which the progestational anti-fertility agent is dispersed throughout a matrix or foam can provide good control of release rate, it is often desirable to coat the matrix or foam with a thin film of another polymer to further enhance precise control over release rate. In such case, release of progestational anti-fertility agent from the device is determined by passage of the agent through the matrix and the film coating of the device. Thus, the device of the invention can take various physical forms. Anti-fertility agent is metered through the walls or body of the device at a controlled rate to the uterus, with the rate of release controlled by the composition, porosity, and thickness of the walls or body of the device. In each instance, the device acts as a depot for the storage and continuous release of anti-fertility agent at a controlled rate to the uterus.

Materials used to form this embodiment of the device are those capable of forming film walls, encapsulating coatings or matrices (solid, gel, or foam) through which the anti-fertility agents can pass at a relatively low rate. In each instance, they must provide a flexible, resilient body with elastic memory. At least the outer surface of the device is a non-irritating polymeric material insoluble in uterine fluids. Use of soluble polymers is to be avoided since dissolution or erosion of the device would effect the constancy of the progestational anti-fertility agent release, as well as the ability of the device to remain in place. Fabrics, fibrous masses and the like, which merely absorb and release drugs or drug solutions in a gross and uncontrollable manner are unsuitable since predictable release of the anti-fertility agent cannot be obtained. Various, non-toxic, flexible resilient polymeric materials having elastic memory can be used to form the intrauterine device of the invention. Exemplary materials for fabricating the device include hydrophobic polymers such as polymethylmethacrylate, polybutylmethacrylate, plasticized or unplasticized polyvinylchloride, plasticized nylon, plasticized soft nylon, plasticized polyethyleneterephthalate, natural rubber, polyisoprene, polyisobutylene, polybutadiene, and silicone rubbers, especially the medical grade polydimethylsiloxanes; hydrophilic polymers such as the hydrophilic hydrogels of esters of acrylic and methacrylic acid as described in U.S. Pats. No. 2,976,576 and 3,220,960 and Belgian Pat. No. 701,813, modified collagen, cross-linked polyvinylalcohol, cross-linked partially hydrolyzed polyvinylacetate, and surface treated silicone rubbers as described in U.S. Pat. No. 3,350,216, and other biologically acceptable, polymeric materials, essentially insoluble in body fluids, such as uterine fluid. When the device formed of a hydrophobic polymeric material, it can be coated with a hydrophilic material to provide a soft hydrophilic surface. Suitable hydrophilic coating materials include those hydrophilic polymers just mentioned. By using a hydrophilic coating with a hydrophobic polymeric membrane, an excellent device is obtained for the hydrophobic material, such as silicone rubber, provides the desired progestational anti-fertility agent metering effect while the hydrophilic coating gives desired tissue compatibility and retards absorption of lipoidal materials by the device. When plasticizers are added to the polymeric materials to further impart flexibility, various plasticizers known to the art can be employed, such as long-chain fatty amides, higher alcohols, dioctylphthalate, and the like.

The following examples are merely illustrative of the present invention and they should not be considered as limiting the scope of the invention in any way, as these examples and other equivalents thereof will become apparent to those versed in the art in the light of the present disclosure, drawings, and the accompanying claims.

EXAMPLE 1

Dry crystalline progesteron (300 milligrams) is mixed with hydroxyethylmethacrylate (9.9 grams), water (1.1 grams) and isopropyl percarbonate (0.12 gram). The mixture is poured into a Teflon® lined mold having an ellipsoidal ridged cavity 1 inch by 1.5 inch containing 0.5 inch of a 6 inch nylon string and polymerized at 60° C. for 2 hours under a nitrogen atmosphere. After removal from the mold, the device is soaked in distilled water for 48 hours to leach out residual monomer. The device is then coated with a flexible membrane having a thickness of 0.5 millimeter by dipping in a chloroform solution of 50–50 copolymer of n-butyl and isobutylmethacrylate. After drying, a hydrophilic coating is applied to the device by dipping in a prepolymer of polyhydroxyethylmethacrylate (prepared from hydroxyethylmethacrylate and 0.02% isopropylpercarbonate at 35° C. for 0.5 hour) containing 0.02% fresh isopropylpercarbonate; the coating is cured at 55° C. for 1 hour in a nitrogen atmosphere after which residual monomer is removed by soaking in distilled water for 48 hours.

The resulting flexible resilient, bulbous device has a soft hydrophilic surface and contains 290 milligrams of progesterone. It has the configuration illustrated in FIG. 1. When inserted in the uterus, it releases about 0.3 milligram of progesterone per day to a warm blooded female animal and thus provides an effective means of birth control for up to one year. Progesterone controlled release rate from the device is constant over time as lipoidal materials are not absorbed by the capsule surface. The device is removed by pulling on the nylon string suitably attached thereto.

EXAMPLE 2

The procedure of Example 1 is repeated except that the progesterone is replaced with 50 milligrams of 6-methyl-16 - methylene - 6 - dehydro - 17α-acetoxyprogesterone (melengestrol acetate). The resulting uterine device provides an effective means of birth control by releasing about 60 micrograms per day of the progestational agent, of 2.5 micrograms per hour for controlling fertility in an adult woman.

EXAMPLE 3

Dry crystalline progesterone (100 milligrams) is mixed with room temperature vulcanizing liquid polydimethylsiloxane (13.5 grams, Dow Corning medical Silastic® 382 elastomer). After uniformly mixing the hormone with the unvulcanized silicone rubber, a stannous octoate (0.5% by weight) is added and the mixture molded in the form of a sphere having a diameter of 25 millimeters and a fluted surface. After allowing the progesterone impregnated silicone rubber sphere to cure for 4 days at room temperature, the silicone rubber surface is rendered hydrophilic by immersing the sphere in a 6% solution of tetraisopropyltitanate in hexane for five minutes. After withdrawing the sphere from the solution, it is dried in air for 2 hours. Then the sphere is immersed for 2 hours in refluxing distilled water and finally, immersed in room temperature distilled water. The resulting uterine capsule has a hydrophilic surface and contains 95 milligrams of progesterone. When inserted into the uterus, the capsule releases about 350 micrograms of progesterone per day to the uterine wall. It is found that the uterine capsule is non-irritating to the uterus and provides for contraception over a period of eight months after which it is removed, discarded, and replaced with an identical sphere.

EXAMPLE 4

The procedure of Example 3 is repeated except that 25 milligrams of 6 - chloro-17α-acetoxy-6-dehydroprogesterone (chlormadinone acetate) is substituted for the progesterone. The resulting spheroidal uterine capsule is effective to release about 50 micrograms of 6-chloro-17α-acetoxy-6-dehydroprogesterone per day to the uterine wall for the control of fertility.

EXAMPLE 5

Uterine capsule is made by coating a solution of poly-n-butylmethacrylate (1 gram) in chloroform (3-milliliters) onto two fluted hemispherical polypropylene forms having a diameter of 1.3 inch. After drying at 35° C. for 1 hour, the cast hemispheres are removed from the forms. Progesterone (400 milligrams in water) is evenly applied to the inside surface of each hemisphere and allowed to dry. The hemispheres are assembled into spherical form by heat sealing their edges. Thereafter, a polyhydroxyethylmethacrylate coating is applied as in Example 1. The resulting capsule is effective to control fertility by releasing about 325 micrograms per day of progesterone to the uterine walls.

Thus, this invention provides a reliable means of fertility suppression. A flexible, resilient intrauterine device having an ellipsoidal shape and a fluted surface is provided for use as a method for controlling fertility. The device is adapted for comfortable, long-term retention in the uterus, without the undesired toxicity and frequent ejection associated with previously proposed related devices. The method is adapted for the continual and prolonged release of progestational anti-fertility agent to control fertility. In addition, progestational anti-fertility agent can be incorporated in and gradually released from the device to the uterus, effecting fertility regulations through chemical action. Although the foregoing has emphasized the device and the method of the invention for fertility suppression, it will be recognized that other biologically or pharmacologically active agents can be administered to the uterus from this uterine device. Thus, the device can contain and release hormones such as estrogens and progestens for hormone replacement therapy; anti-inflammatory agents; anti-biotics; fungicides; muscle relaxants; and others. While the invention has been described and illustrated with reference to certain preferred embodiments thereof, those skilled in the art will appreciate that various modifications, changes, omissions and substitutes can be made without departing from the spirit of the invention. It is intended, therefore, that the invention be limited only by the scope of the following claims.

I claim:

1. An intrauterine contraceptive device, non-irritating to the uterus and which does not cause erosion or perforation of the uterine walls, said device being adapted for comfortable long term retention in a uterus, and which device is comprised of a flexible, resilient body of polymeric material having an elastic memory, said resilient body containing a progestational anti-fertility agent and is permeable to the passage of the said progestational anti-fertility agent, said body having a central core provided with a fluted surface and defining a bulbous ellipsoidal shape, the said fluted surface comprising continuous projections running geometrically about an axis of the said central core and being wholly integral therewith, and the said fluted surface also being adapted to absorb force applied in any direction to the device by uterine contractions and defining the sole means by which the device is mechanically retained in proper place abutting against the walls of the uterus, whereby the said body can be inserted into the uterine cavity in compacted state and thereupon will assume the bubous ellipsoidal configuration when inserted in the uterine cavity and release fertility suppressing amounts of said progestational anti-fertility agent to the uterus.

2. An intrauterine contraceptive device according to claim 1 wherein the device contains a progestational agent selected from the group consisting of progesterone and chlormadinone acetate.

3. An intrauterine contraceptive device according to claim 1 wherein the body is in the form of a hollow container having the progestational anti-fertility agent in the interior chamber thereof that is released from the chamber in an effective amount for producing an anti-fertility effect.

4. An intrauterine contraceptive device according to claim 3 wherein the body is in the form of a hollow container and it contains microcapsules of said progestational anti-fertility agent encapsulated with a material permeable thereto.

5. An intrauterine contraceptive device according to claim 1 wherein the body is in the form of a polymeric matrix having the progestational anti-fertility agent distributed therethrough and is released from the matrix in an effective amount for producing an anti-fertility effect.

6. An intrauterine contraceptive device according to claim 5 wherein the body is in the form of a polymeric matrix having the progestational anti-fertility agent distributed therethrough, said polymeric matrix coated with a coating permeable to the passage of said anti-fertility agent to meter the flow of the anti-fertility agent to the uterus.

7. A method of suppressing fertility in a female mammal wherein said method comprises maintaining the intrauterine contraceptive device of claim 1 in the uterine cavity of said mammal for administering a fertility suppressing amount of said progestational anti-fertility agent to the uterus over a prolonged period of time.

References Cited

UNITED STATES PATENTS 3,312,215   4/1967   Silber _____ 128—131

FOREIGN PATENTS 892,386   3/1962   Great Britain.
981,389   1/1965   Great Britain.

OTHER REFERENCES

Doyle et al.: Am. J. Obstet. Gynec., 101(4):564–8, June 19, 1968, "Preliminary Studies on the Effect of Hormone—Releasing Intrauterine Devices."

Scommegna et al.; Fertility and Sterility, 21(3):201–210, March 1970, "Intrauterine Administration of Progesterone by a Slow Releasing Device."

Cohen et al.: Fertility and Sterility, 21(10):715–723, October 1970, "The Effects of an Intracervical Steroid—Releasing Device on the Cervical Mucus."

SHEP K. ROSE, Primary Examiner

U.S. Cl. X.R.

128—130, 260